(12) United States Patent
Wurm et al.

(10) Patent No.: US 11,272,821 B2
(45) Date of Patent: Mar. 15, 2022

(54) FLOOR TREATMENT SYSTEM AND METHOD FOR OPERATING SUCH A SYSTEM

(71) Applicant: ALFRED KARCHER SE & CO. KG, Winnenden (DE)

(72) Inventors: Christian Wurm, Waiblingen (DE);
Heiko Blumhardt, Remseck (DE);
Barbara Pfister, Weissach im Tal (DE);
Christoph Waller, Schwaikheim (DE);
Christian Hofner, Welzheim (DE)

(73) Assignee: ALFRED KÄRCHER SE & CO. KG, Winnenden (DE)

( * ) Notice: Subject to any disclaimer, the term of this patent is extended or adjusted under 35 U.S.C. 154(b) by 560 days.

(21) Appl. No.: 16/178,933

(22) Filed: Nov. 2, 2018

(65) Prior Publication Data

US 2019/0069749 A1 Mar. 7, 2019

Related U.S. Application Data

(63) Continuation of application No. PCT/EP2016/060092, filed on May 4, 2016.

(51) Int. Cl.
*A47L 11/30* (2006.01)
*A47L 11/40* (2006.01)
(Continued)

(52) U.S. Cl.
CPC ........... *A47L 11/302* (2013.01); *A47L 9/2873* (2013.01); *A47L 11/145* (2013.01);
(Continued)

(58) Field of Classification Search
CPC .. A47L 11/302; A47L 11/145; A47L 11/4011; A47L 11/4019; A47L 11/4025;
(Continued)

(56) References Cited

U.S. PATENT DOCUMENTS

| 5,572,759 A | 11/1996 | Zachhuber |
| 5,959,423 A | 9/1999 | Nakanishi et al. |

(Continued)

FOREIGN PATENT DOCUMENTS

| CN | 1551740 | 12/2004 |
| CN | 1665438 | 9/2005 |

(Continued)

OTHER PUBLICATIONS

Translated International Preliminary Report on Patentability for International (PCT) Patent Application No. PCT/EP2016/060060, dated Nov. 15, 2018, 9 pages.

(Continued)

*Primary Examiner* — David Redding
(74) *Attorney, Agent, or Firm* — Sheridan Ross P.C.

(57) ABSTRACT

The present invention relates to a floor treatment system, comprising a mobile floor treatment apparatus and a docking station therefor, wherein the floor treatment apparatus comprises a control device, at least one control line coupled thereto, and an electrical energy storage device for supplying energy to the floor treatment apparatus, and the docking station comprises at least one actuator and at least one control line coupled thereto; wherein, when the floor treatment apparatus is in a docked position on the docking station, the control lines are coupled to one another in contact-based manner by way of control line connection elements, wherein the floor treatment system comprises a detection device for determining whether the floor treatment apparatus is in the docked position, and wherein, if this is determined positively, at least one of the actuators of the control device is actuatable or controllable by way of the control lines. The present invention further relates to a method for operating such a floor treatment system.

39 Claims, 7 Drawing Sheets

(51) Int. Cl.
*A47L 9/28* (2006.01)
*A47L 11/14* (2006.01)

(52) U.S. Cl.
CPC ....... *A47L 11/4011* (2013.01); *A47L 11/4019* (2013.01); *A47L 11/4025* (2013.01); *A47L 11/4083* (2013.01); *A47L 2201/02* (2013.01); *A47L 2201/022* (2013.01); *A47L 2201/024* (2013.01); *A47L 2201/026* (2013.01)

(58) Field of Classification Search
CPC ............. A47L 11/4083; A47L 2201/02; A47L 2201/022; A47L 2201/024; A47L 2201/026; A47L 9/2873
See application file for complete search history.

(56) References Cited

U.S. PATENT DOCUMENTS

| | | |
|---|---|---|
| 7,891,387 B2 | 2/2011 | Lim et al. |
| 8,776,305 B2 | 7/2014 | Troff et al. |
| 9,687,131 B2 | 6/2017 | Eidmohammadi et al. |
| 2018/0192834 A1 | 7/2018 | Isenberg et al. |

FOREIGN PATENT DOCUMENTS

| | | |
|---|---|---|
| CN | 101057767 | 10/2007 |
| CN | 101254080 | 9/2008 |
| CN | 201572039 | 9/2010 |
| CN | 102357480 | 2/2012 |
| CN | 103200852 | 7/2013 |
| CN | 104010485 | 8/2014 |
| CN | 204860064 | 12/2015 |
| CN | 106470584 | 3/2017 |
| DE | 4230197 | 3/1994 |
| DE | 102005045669 | 3/2007 |
| DE | 102010038422 | 1/2012 |
| DE | 102014105460 | 10/2015 |
| EP | 1762165 | 3/2007 |
| EP | 2648307 | 10/2013 |
| KR | 10-2014-0036653 | 5/2014 |
| WO | WO 94/05197 | 3/1994 |
| WO | WO 2005/104921 | 11/2005 |
| WO | WO 2015/082017 | 6/2015 |

OTHER PUBLICATIONS

Translated International Preliminary Report on Patentability for International (PCT) Patent Application No. PCT/EP2017/059347, dated Nov. 15, 2018, 8 pages.
Translated International Preliminary Report on Patentability for International (PCT) Patent Application No. PCT/EP2016/060077, dated Nov. 15, 2018, 8 pages.
Translated International Preliminary Report on Patentability for International (PCT) Patent Application No. PCT/EP2016/060092, dated Nov. 15, 2018, 9 pages.
U.S. Appl. No. 16/178,836, filed Nov. 2, 2018, Juettner et al.
U.S. Appl. No. 16/178,859, filed Nov. 2, 2018, Juettner et al.
U.S. Appl. No. 16/178,909, filed Nov. 2, 2018, Blumhardt et al.
International Search Report for International (PCT) Patent Application No. PCT/EP2016/060060, dated Jan. 10, 2017, 2 pages.
International Search Report for International (PCT) Patent Application No. PCT/EP2017/059347, dated Jul. 25, 2017, 2 pages.
International Search Report for International (PCT) Patent Application No. PCT/EP2016/060077, dated Jan. 13, 2017, 2 pages.
International Search Report for International (PCT) Patent Application No. PCT/EP2016/060092, dated Jan. 17, 2017, 2 pages.
Official Action (with English translation) for Chinese Patent Application No. 201680084615.4, dated Jun. 3, 2020, 15 pages.
Official Action (with English translation) for Chinese Patent Application No. 201680084638.5, dated Jun. 30, 2020, 10 pages.
Official Action (with English translation) for Chinese Patent Application No. 201780023750.2, dated Jun. 4, 2020, 23 pages.
Official Action (with English translation) for Chinese Patent Application No. 201680084626.2, dated Jun. 17, 2020, 13 pages.
Official Action for U.S. Appl. No. 16/178,836, dated Jan. 14, 2021, 10 pages.
Notice of Allowance for U.S. Appl. No. 16/178,836, dated May 4, 2021, 8 pages.
Notice of Allowance for U.S. Appl. No. 16/178,859, dated Feb. 17, 2021, 7 pages.
Notice of Allowance for U.S. Appl. No. 16/178,909, dated Jan. 19, 2021, 7 pages.

FLOOR TREATMENT SYSTEM AND METHOD FOR OPERATING SUCH A SYSTEM

CROSS-REFERENCE TO RELATED APPLICATIONS

This application is a continuation application under 35 U.S.C. 111(a) of international application number PCT/EP2016/060092, filed on May 4, 2016, the entire disclosure of which is hereby incorporated by reference.

FIELD OF THE INVENTION

The present invention relates to a floor treatment system, comprising a mobile floor treatment apparatus and a docking station therefor, wherein the floor treatment apparatus comprises a control device, at least one control line coupled thereto, and an electrical energy storage device for supplying energy to the floor treatment apparatus.

The present invention further relates to a method for operating a floor treatment system.

The floor treatment system is for example a floor cleaning system, wherein the floor treatment apparatus takes the form of a floor cleaning apparatus. This may have at least one cleaning unit for cleaning the floor surface, to which a cleaning liquid (usually water) may preferably be applied from a reservoir for enhancing the cleaning action. Loosened dirt and cleaning liquid may preferably be taken up from the floor surface and transferred to a dirty liquid container of the floor treatment apparatus.

The floor treatment apparatus may take a form that is self-propelling and self-steering in order to enable autonomous treatment of the floor surface. The floor treatment apparatus is thus in particular a robot.

As an alternative or in addition, it may be provided for the floor treatment apparatus to be guided manually. An operator may guide the floor treatment apparatus over the floor surface. Optionally, a drive for a travelling gear may be present.

BACKGROUND OF THE INVENTION

In a floor treatment system of the type mentioned in the introduction, a docking station is provided for the floor treatment apparatus. The floor treatment apparatus can move/be moved to the docking station, autonomously or guided by an operator, and adopt a docked position there. This enables a consumable component to be supplied to the floor treatment apparatus. This is for example electrical energy supplied to the energy storage device. It is also conceivable to supply a liquid, for example the above-mentioned cleaning liquid for the reservoir. Once filling with the consumable component has been performed, the floor treatment apparatus can leave the docking station, and floor treatment can continue.

EP 1 762 165 A2 describes a floor treatment system taking the form of a floor cleaning system. In a filling position, a cleaning robot can transmit a wireless signal to a base station. Then, the base station moves a filling conduit into position in order to fill a liquid container of the robot. As a result, the base station is highly complex. Further, as the consumable component, electrical energy can be supplied to the robot, wherein, in a docked position of the robot, exposed electrical contact elements on the base station and on the robot can make an electrical connection. There is a risk of undesired short circuit by a conductive article, in particular of the contact elements on the station, resulting in damage to the base station.

WO 2015/082017 A1 discloses an advantageous floor cleaning system in which the risk of electrical short circuit of both contact elements on the station and contact elements of the floor cleaning apparatus is reduced.

In U.S. Pat. No. 5,959,423 as well, a floor cleaning system having a cleaning robot and a base station therefor is described, wherein the base station receives optically transmitted signals from the robot for filling it with a cleaning liquid, and consequently is highly complex. Similarly to the floor cleaning system in accordance with EP 1 762 165 A2, there is a risk of malfunction.

An object underlying the present invention is to provide a floor treatment system and a method for operating such a system that is of low complexity. Further, it is preferably desirable for the floor treatment system to have a high level of operational safety, in particular for supplying a consumable component to the floor treatment apparatus.

SUMMARY OF THE INVENTION

In a first aspect of the invention, a floor treatment system comprises a mobile floor treatment apparatus and a docking station therefor. The floor treatment apparatus comprises a control device, at least one control line coupled thereto, and an electrical energy storage device for supplying energy to the floor treatment apparatus. The docking station comprises at least one actuator and at least one control line coupled thereto. When the floor treatment apparatus is in a docked position on the docking station, the control lines are coupled to one another in contact-based manner by way of control line connection elements. The floor treatment system comprises a detection device for determining whether the floor treatment apparatus is in the docked position, and if this is determined positively, at least one actuator of the control device is actuatable or controllable by way of the control lines.

In a second aspect of the invention, a method for operating a floor treatment system that comprises a mobile floor treatment apparatus and a docking station therefor, provides, when the floor treatment apparatus is in a docked position, for connection elements of the floor treatment apparatus and the docking station to be coupled to one another in contact-based manner, and for an electrical connection to be formed between a control device of the floor treatment apparatus and at least one actuator arranged in the docking station by way of respective control lines of the floor treatment apparatus and the docking station. It is determined if the floor treatment apparatus is in the docked position, and, if this is determined positively, the at least one actuator is controlled or actuated by the control device by way of the control lines.

BRIEF DESCRIPTION OF THE DRAWINGS

The foregoing summary and the following description may be better understood in conjunction with the drawing figures, of which.

DETAILED DESCRIPTION OF PREFERRED EMBODIMENTS OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a floor treatment system, comprising a mobile floor treatment apparatus and a docking station therefor, wherein the floor treatment apparatus comprises a control device, at least one control line coupled thereto, and an electrical energy storage device for supplying energy to the floor treatment apparatus. The docking station comprises at least one actuator and at least one control line coupled thereto, and when the floor treatment apparatus is in a docked position on the docking station, the control lines are coupled to one another in contact-based manner by way of control line connection elements. The floor treatment system comprises a detection device for determining whether the floor treatment apparatus is in the docked position, and if this is determined positively, at least one actuator of the control device is actuatable or controllable by way of the control lines.

The invention arises from the consideration that the floor treatment apparatus comprises a control device that is needed in particular for controlling an autonomous floor treatment apparatus. However, typically a manually guided floor treatment apparatus also has a control device of this kind, which receives user inputs at an operating device and controls functional units such as a cleaning tool, a driving device or a cleaning agent metering device in dependence on the user inputs. In the floor treatment system in accordance with the invention, it is provided, when the floor treatment apparatus is in the docked position, for control lines of the floor treatment apparatus and of the docking station to be coupled to one another in contact-based manner by way of control line connection elements. This makes it possible to actuate or control the at least one actuator reliably and without faults, wherein in particular the supply of a consumable component from the docking station to the floor treatment apparatus is enabled or disabled by way of the at least one actuator. Moreover, a control device in the docking station can be dispensed with, with the result that the docking station is of low complexity. The risk of malfunction is extremely low. For this purpose, the detection device is further provided to determine the fact that the floor treatment apparatus is actually in the docked position. Consequently, erroneous actuation or control of the at least one actuator can be avoided, as a result of which the floor treatment system has a high level of operational safety.

It has proved advantageous for the floor treatment apparatus to have the electrical energy storage device. Electrical energy for controlling or actuating the at least one actuator can be provided by the floor treatment apparatus. There is no need for a separate energy supply in the docking station for the at least one actuator.

By way of the control lines and possible return lines of the floor treatment apparatus and the docking station, it is possible to close a control circuit into which the at least one actuator is connected on the station side. This is discussed in more detail below.

The energy storage device preferably comprises at least one rechargeable battery. The control device preferably has an on-board charging unit that can be used to control a charging procedure for the at least one battery.

It has proved favorable if the floor treatment apparatus comprises an energy supply line and the docking station comprises an energy supply line, wherein, when the floor treatment apparatus is in the docked position, the energy supply lines are coupled to one another in contact-based manner by way of energy supply connection elements, and if the at least one actuator comprises or forms an electrical switch actuator by which the energy supply line of the docking station is activatable by the control device in order to apply electrical energy to the at least one battery for charging. Electrical energy may be provided from the docking station, which is for example connected to a power supply network, by way of the energy supply lines for charging the at least one battery. The detection device and the switch actuator ensure that electrical energy is only applied to the energy supply connection elements once the floor treatment apparatus is in the docked position and the switch actuator activates the energy supply line. As a result, electrical voltage on the station side can be avoided until the floor treatment apparatus adopts the docked position. This enhances the operational safety of the floor treatment system. The present embodiment is particularly advantageous if a mains voltage of for example approximately 230 V or approximately 120 V is applied across the energy supply connection elements.

It will be appreciated that the floor treatment system has in particular return lines in the docking station and in the floor treatment apparatus for the electrical energy supply lines, for forming a charging circuit that can be closed by way of the energy supply connection elements.

Favorably, the energy supply connection elements are formed separately from the control line connection elements. This makes it possible to avoid any malfunctions between currents through the control lines on the one hand and the energy supply lines on the other, or from potential differences between the control lines on the one hand and the energy supply lines on the other hand. The electromagnetic compatibility of the floor treatment system is enhanced.

For this last advantage, it is particularly favorable if the energy supply connection elements and the control line connection elements are spatially separated and are arranged spaced from one another on the floor treatment apparatus and the docking station.

For example, it is provided for the floor treatment apparatus and/or the docking station to comprise a connection unit that receives a respective energy supply connection element and a respective control line connection element. Both the floor treatment apparatus and the docking station can comprise a respective connection unit. A respective pair of connection elements (for control lines or for energy supply lines) can comprise or form a plug connector and a socket. The plug connector can be arranged on the station side and the socket on the apparatus side, or vice versa. At least one connection unit can be held on the docking station or the floor treatment apparatus such that its position is variable, in order to facilitate docking of the floor treatment apparatus.

Advantageously, the switch actuator is controllable by the control device for deactivating the energy supply line of the docking station. For ending the docking procedure, the energy supply line can be deactivated. This allows the energy supply connection elements to be de-energized on undocking, in order to avoid electrical discharge. This enhances the operational safety of the floor treatment system.

It may be provided for the energy supply lines and the energy supply connection elements to be designed for a mains voltage supply, in particular AC voltage of approximately 230 V or approximately 120 V.

As an alternative or in addition, it may be provided for the control lines and the control line connection elements to be designed for a low voltage, in particular DC voltage of approximately 24 V or approximately 12 V. The low voltage may be a so-called extra-low voltage (ELV).

In an advantageous embodiment of the floor treatment system, it is provided for the at least one actuator to be actuatable or controllable by the provision of an electrical potential difference and/or by the transmission of a control signal from the control device.

It is advantageous if the docking station comprises a plurality of actuators, and if the floor treatment apparatus and the docking station each have a plurality of control lines, wherein a respective actuator is controllable by way of a control line of the floor treatment apparatus and a control line of the docking station, and if a respective common control line connection element is provided on the floor treatment apparatus and the docking station for the respective control lines. This enables on the one hand a structurally simple form of the control line connection elements and on the other a reliable coupling between corresponding control lines.

It proves favorable if the floor treatment apparatus comprises a return line that is coupled to the control device, and if the docking station comprises at least one return line, and between this and the at least one control line of the docking station there is connected the at least one actuator, wherein, when the floor treatment apparatus is in the docked position, the return lines are coupled to one another by way of connection elements, and a control circuit is formed by way of the control lines and the return lines. In the docked position, a current can flow through the control lines, the at least one actuator and the return lines, as a result of which the at least one actuator is actuatable by the control device. The polarity of the control lines and the return lines may be such that the current flow is first through the control lines and then through the return lines, or first through the return lines and then through the control lines. Accordingly, the return lines may also be regarded as supply lines.

For functioning of the at least one actuator, it may be provided for the return lines to be at a first potential, for example earth potential, and for the control lines to be raised to a second potential, for example a low-voltage potential of approximately 24 V or approximately 12 V, for actuating the at least one actuator.

Favorably, the return lines of the floor treatment apparatus and the docking station are coupled to one another by way of the respective control line connection element of the floor treatment apparatus and the docking station. As a result, separate connection elements for the return lines can be dispensed with. The control line connection elements may for example receive respective electrical contact elements for the control lines and the return lines.

It is advantageous if the floor treatment apparatus and the docking station each comprise a common return line, wherein the return line of the floor treatment apparatus is coupled to the control device and a respective actuator is connected between the return line of the docking station and the respective control line thereof. It is possible for only one return line to be provided in each case on the station side and on the apparatus side in order to achieve a structurally simple form of the floor treatment system. The return lines are preferably at a common potential, for example earth potential. By way of a respective actuator, a respective control line is connected on the station side to the return line thereof.

It proves advantageous if, for determining whether the floor treatment apparatus is in the docked position, the detection device is configured to determine whether the floor treatment apparatus and the docking station are in electrically conductive contact. This enables a structurally simple form and at the same time reliable functioning of the detection device.

In an advantageous embodiment of the floor treatment system, the detection device comprises the control device and detection lines in the floor treatment apparatus coupled thereto, which are electrically conductively connected to one another in the docked position of the floor treatment apparatus by way of a contact bridge at the docking station. When the floor treatment apparatus adopts the docked position, a detection circuit is closed by way of the detection lines in the floor treatment apparatus and the contact bridge of the docking station that connects the detection lines to one another. This can be detected by the control device and interpreted as positive determination of adoption of the docked position.

Advantageously, the detection lines are coupled to one another with the contact bridge by way of the control line connection elements of the floor treatment apparatus and the docking station. As a result, it is possible to dispense with separate connection elements for the detection lines and the contact bridge, and the floor treatment system can be given a structurally simple form.

It may advantageously be provided for at least one actuator of the docking station to be connected into the contact bridge. When the docked position is adopted, in this way a circuit through the at least one actuator is closed. As a result, on the one hand adoption of the docked position can be detected. On the other hand, it is possible already to check the functionality of the actuator before it is actuated or controlled. An actuator of this kind is for example a switch actuator, in particular a relay, by way of which an energy supply line of the docking station is activatable or deactivatable.

It may advantageously be provided for the detection device to comprise the control device by which an electrically conductive connection through a respective control line of the floor treatment apparatus and of the docking station, at least one actuator and a respective return line of the floor treatment apparatus and of the docking station is detectable, wherein these return lines are coupled to one another in the docked position. The control line and the return line of the floor treatment apparatus may in particular be regarded as the above-mentioned detection lines. The control line and the return line of the docking station and the at least one actuator connected between them may form the above-mentioned contact bridge.

Advantageously, it is provided that by means of the control device electrically conductive connections via respective control lines of the floor treatment apparatus and the docking station through two or more actuators are detectable. This allows the functionality of the two or more actuators to be checked before they are actuated or controlled.

It is favorable if the at least one actuator comprises or forms an electrical switch actuator, in particular a relay, for selectively activating or deactivating an energy supply line of the docking station.

The switch actuator may for example, as mentioned above, activate the energy supply line of the docking station in order to apply electrical energy to the floor treatment apparatus.

As an alternative or in addition, it may be provided for the docking station to comprise a pumping unit that is configured to be acted upon by the energy supply line and by way of which liquid is conveyable in a fluid conduit of the docking station. By way of the switch actuator, the pumping unit can be switched on or off in order to convey liquid when required. For example, a dirty liquid container of the floor treatment apparatus may be emptied into a container of the docking station (for example a collection container), and the dirty liquid can be pumped out of the container and supplied to a liquid drainage network.

In an advantageous embodiment of the floor treatment system, the docking station comprises a supply conduit through which a liquid is suppliable to the floor treatment apparatus and into which there is connected a valve. The liquid is in particular the above-mentioned cleaning liquid, specifically water, which can be stored in a reservoir of the floor treatment apparatus. The supply conduit can be coupled to a corresponding liquid conduit of the floor treatment apparatus by way of respective connection elements when the floor treatment apparatus is in the docked position. The reservoir can be filled by way of the liquid conduit. As an alternative, it may be provided, when the floor treatment apparatus is docked, for the supply conduit to enable direct filling of the reservoir, in that a container wall thereof is opened and liquid can flow out of the supply conduit and into the container. The supply conduit can be selectively opened or blocked by the valve.

As mentioned, it may be provided, when the floor treatment apparatus is in in the docked position, for the supply conduit to be in fluidic connection with a liquid conduit of the floor treatment apparatus by way of respective connection elements. The connection elements are preferably arranged in the above-mentioned connection units.

The at least one actuator preferably comprises or forms a valve actuator by way of which the valve for selectively unblocking or blocking the supply conduit is actuatable. When the floor treatment apparatus is docked, the control device can open the supply conduit by actuating the valve actuator, for example for filling the reservoir. Once the reservoir is filled, the control device can block the supply conduit by actuating the valve actuator.

As an alternative or in addition, it may be provided for a valve actuation element, to which electrical energy is applicable by an energy supply line of the floor treatment system, to be coupled to the valve.

An advantageous embodiment of the floor treatment system is characterized in that the floor treatment apparatus has a contact element that, in the docked position, makes mechanical contact with, and actuates, an electrical switching element that is connected into the energy supply line, as a result of which electrical energy is applied to the valve actuation element by way of the energy supply line. In the present embodiment, the valve in the supply conduit may also be actuated with no actuator provided. In this way, the complexity of the floor treatment system may be further reduced. The contact element, for example a push button, slide or similar, can make mechanical contact with the switching element. By applying electrical energy to the valve actuation element, the supply conduit can be opened. When the floor treatment apparatus is undocked, the mechanical contact between the contact element and the switching element is removed, and the supply conduit is blocked. An embodiment of this kind offers the advantage that the docking station can be used even with structurally simple floor treatment apparatuses and without a control device, so it is highly versatile. With a floor treatment apparatus of this kind, it is possible at least to supply liquid as a consumable component without the need to actuate or control an actuator for this purpose.

The same advantages are achieved by an advantageous embodiment of another kind in which the energy supply line comprises a first line portion and a second line portion in the docking station which, when the floor treatment apparatus is in the docked position, are electrically conductively connected to one another by way of a contact bridge on the floor treatment apparatus. In the docked position, a current can flow over the line portions and the contact bridge in order to be applied to the valve actuation element.

Favorably, the line portions are coupled by way of the control line connection elements of the docking station and the floor treatment apparatus with the contact bridge. This enables a structurally simple form in which separate connection elements for the line portions and the contact bridge can be dispensed with.

Advantageously, a voltage converter is connected into the energy supply line for converting a mains voltage from a power supply network on the input side into a low voltage applied across the valve actuation element. Electrical safety at the docking station is enhanced by the fact that no mains voltage is applied across the valve actuation element.

It is advantageous if there is connected into the energy supply line a timing member by way of which electrical energy is applied to the valve actuation element with a delay after actuation of the switching element or after a conductive connection is made between the line portions by way of the contact bridge. Once the switching element has been actuated or the contact has been closed by way of the contact bridge, the valve can be actuated for opening the supply conduit with a delay of preferably a few seconds. In order to enhance operational safety, this may be provided in order to ensure that any connection elements of the supply conduit and the liquid conduit of the floor treatment apparatus are in fluid-tight connection with one another.

It is favorable if the floor treatment apparatus has a liquid container and an outlet conduit that is connected thereto and into which a valve is connected, and if at least one actuator comprises or forms an electrical valve actuator or drive actuator for the valve, by way of which the valve is actuatable for selectively unblocking or blocking the outlet conduit. The liquid container is for example the above-mentioned dirty liquid container for receiving a dirty liquid. In the docked position, the actuator can be controlled or actuated in order to open the outlet conduit. For example, the liquid container is emptied into the above-mentioned collection container of the docking station. After emptying, the outlet conduit can be blocked again.

It may be provided for at least one actuator to be controllable by the control device in dependence on at least one input signal supplied to the control device.

The input signal may for example be or comprise a level signal of a level sensor that is associated with a liquid container of the floor treatment apparatus or the docking station, wherein the at least one actuator comprises or forms a valve actuator for selectively unblocking or blocking a fluid conduit of the docking station or of the floor treatment apparatus. If the liquid container is a reservoir, then by way of the input signal the control device can preferably determine whether it is to be filled or whether, during filling, a predeterminable level has been reached. The fluid connection may be opened or blocked as necessary. If the liquid container is for example a collection container of the docking station for dirty liquid, the level can be detected and an electrical switch actuator for actuating the above-mentioned pumping unit can be controlled or actuated as necessary.

An input signal may be or comprise a charge condition signal of a rechargeable battery of the floor treatment apparatus, wherein the at least one actuator comprises or forms an electrical switch actuator for selectively activating or deactivating an energy supply line of the docking station. If the battery is to be charged, the energy supply line can be activated by way of the switch actuator.

Once the battery is sufficiently charged, the energy supply line can be deactivated by way of the switch actuator.

In an advantageous embodiment of the floor treatment system, the floor treatment apparatus may be self-propelling and self-steering in order to enable autonomous treatment of a floor surface.

As an alternative or in addition, it may be provided for the floor treatment apparatus to be guided manually and to be guided over the floor surface by an operator. This may be a ride-on apparatus or a walk-behind apparatus.

Depending on the mode of operation, it may be provided for the floor treatment apparatus to be operated in self-propelling and self-steering manner or with manual guidance.

Advantageously, the floor treatment apparatus may be a floor cleaning apparatus and have at least one cleaning unit for cleaning a floor surface. For example, the cleaning unit comprises a roller-shaped or plate-shaped cleaning tool that is drivable in rotation. Further, the floor treatment apparatus may comprise a reservoir for a consumable component in the form of a cleaning liquid, and/or a dirty liquid container.

The floor treatment apparatus may in particular be a scrubber/vacuum cleaner.

As already mentioned, the present invention further relates to a method. A method in accordance with the invention that achieves the object mentioned in the introduction, for operating a floor treatment system that comprises a mobile floor treatment apparatus and a docking station therefor, provides, when the floor treatment apparatus is in a docked position, for connection elements of the floor treatment apparatus and the docking station to be coupled to one another in contact-based manner, and for an electrical connection to be formed between a control device of the floor treatment apparatus and at least one actuator arranged in the docking station by way of respective control lines of the floor treatment apparatus and the docking station, wherein it is determined if the floor treatment apparatus is in the docked position, and, if this is determined positively, the at least one actuator is controlled or actuated by the control device by way of the control lines.

The advantages that have already been mentioned in the context of the explanation of the floor treatment system in accordance with the invention can likewise be achieved by the method. Reference may be had to the explanations above in this regard.

Advantageous exemplary embodiments of the method in accordance with the invention are apparent from advantageous embodiments of the floor treatment system in accordance with the invention. In this regard too, Reference may be had to the statements above.

Figure 1:
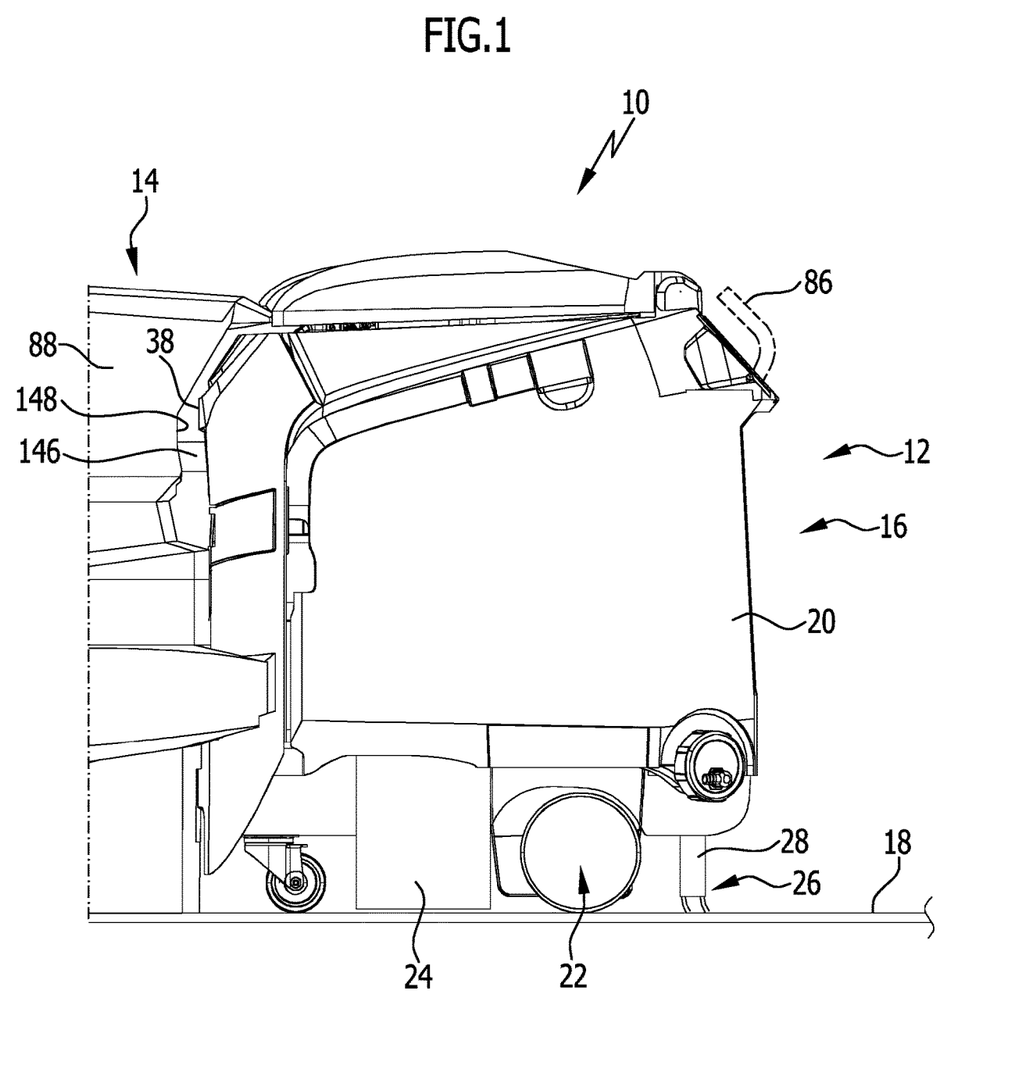
FIG. 1 shows a side view of a floor treatment system in accordance with the invention, comprising a docking station and a floor treatment apparatus adopting a docked position thereto and taking the form of a floor cleaning apparatus.
Figure 2:
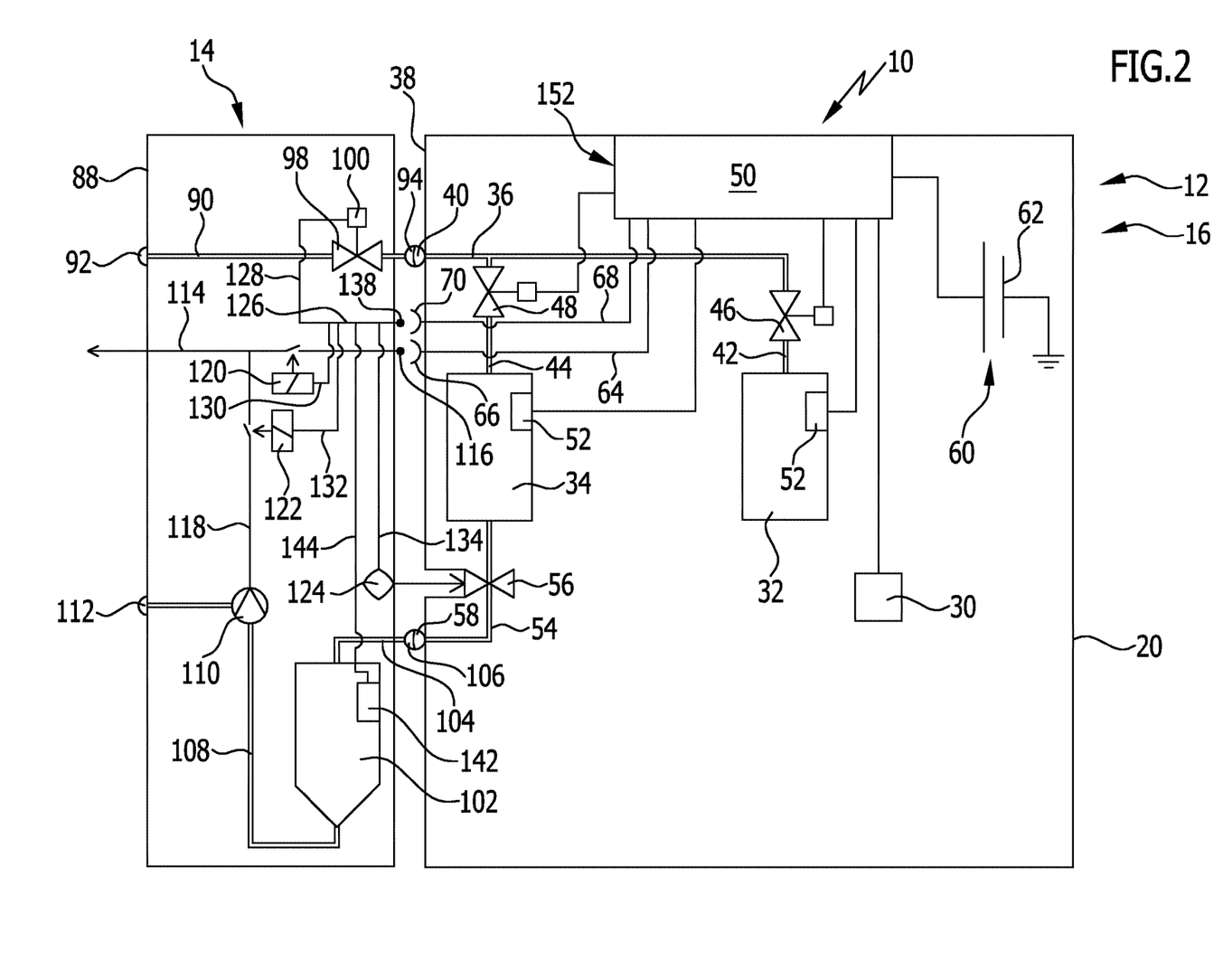
FIG. 2 shows a schematic block diagram of (part of) the floor treatment system from FIG. 1.

FIGS. 1 and 2 show an advantageous embodiment, designated by the reference numeral 10, of a floor treatment system in accordance with the invention that has a floor treatment apparatus 12 and a docking station 14 therefor. The floor treatment apparatus 12 takes the form of a floor cleaning apparatus 16 and is designated the apparatus 16 below for the sake of simplicity. The apparatus 16 serves to clean a floor surface 18.

The apparatus 16 comprises a housing 20 having a travelling gear 22 held on the underside thereof, for rolling on the floor surface 18. The apparatus 16, a scrubber/vacuum cleaner, further comprises a cleaning unit 24 that has in particular at least one roller-shaped or plate-shaped cleaning tool (not shown) that is drivable in rotation about an axis of rotation. A further cleaning unit in the form of a dirt receiving device 26 is provided. The dirt receiving device 26 comprises a suction bar 28 and a suction unit 30, in order to apply negative pressure to the suction bar 28.

In the present document, indications of position and orientation such as "below", "above" or similar are to be understood in relation to a position of use of the floor treatment system 10 on the floor surface 18.

Further, the apparatus 16 comprises a reservoir 32 for a cleaning liquid, in particular water, and a dirty liquid container 34. When the apparatus 16 is in operation, cleaning liquid from the reservoir 32 can be used for application to the floor surface 18. Under the action of the cleaning unit 24, the floor surface 18 can be cleaned, wherein the cleaning liquid serves to enhance the cleaning action. As a supplementary measure, a chemical cleaning agent may be added. The mixture of dirt and cleaning liquid—the dirty liquid— can be taken up from the floor surface 18 by the dirt receiving device 26 and deposited in the dirty liquid container 34.

The apparatus 16 comprises a liquid conduit 36 with a connection element 40 that is arranged on a front side 38 of the apparatus 16, in the present case a connection nipple. The liquid conduit 36 branches into a first conduit portion 42, which opens into the reservoir 32, and a second conduit portion 44, which opens into the dirty liquid container 34.

The term "front side" relates to a direction of longitudinal or principal movement of the apparatus 16. In the docked position of the apparatus 16, the front side 38 faces an end face of the docking station 14.

Valves 46, 48 are connected into the conduit portions 42, 44. A control device 50 of the apparatus 16 is coupled to the valves 46, 48 in a signally active manner. The conduit portions 42 and 44 may be selectively blocked or opened by the control device 50. This provides the possibility, discussed in more detail below, of filling the reservoir 32 or rinsing and hence cleaning the dirty liquid container 34.

A respective level sensor 52 on the reservoir 32 and on the dirty liquid container 34 is coupled to the control device 50 in a signally active manner, in order to provide the control device 50 with a level signal relating the liquid level in the reservoir 32 and the dirty liquid container 34 respectively.

Connected to an outlet opening of the dirty liquid container 34 is an outlet conduit 54. A valve 56 which is actuatable in a manner described below is connected into the outlet conduit 54. At the end of the outlet conduit 54 there is arranged a connection element 58 that is positioned on the front side 38.

The apparatus 16 comprises an energy storage device 60 for supplying energy, having at least one rechargeable battery 62. Electrical energy from the energy storage device 60 serves to provide an internal supply to the apparatus 16 and actuators of the docking station 14 in a manner explained below.

The apparatus 16 can be supplied with electrical energy by way of an energy supply line 64. The energy supply line 64 is connected to the control device 50 and has an energy supply connection element 66 arranged on the front side 38.

Figure 5:
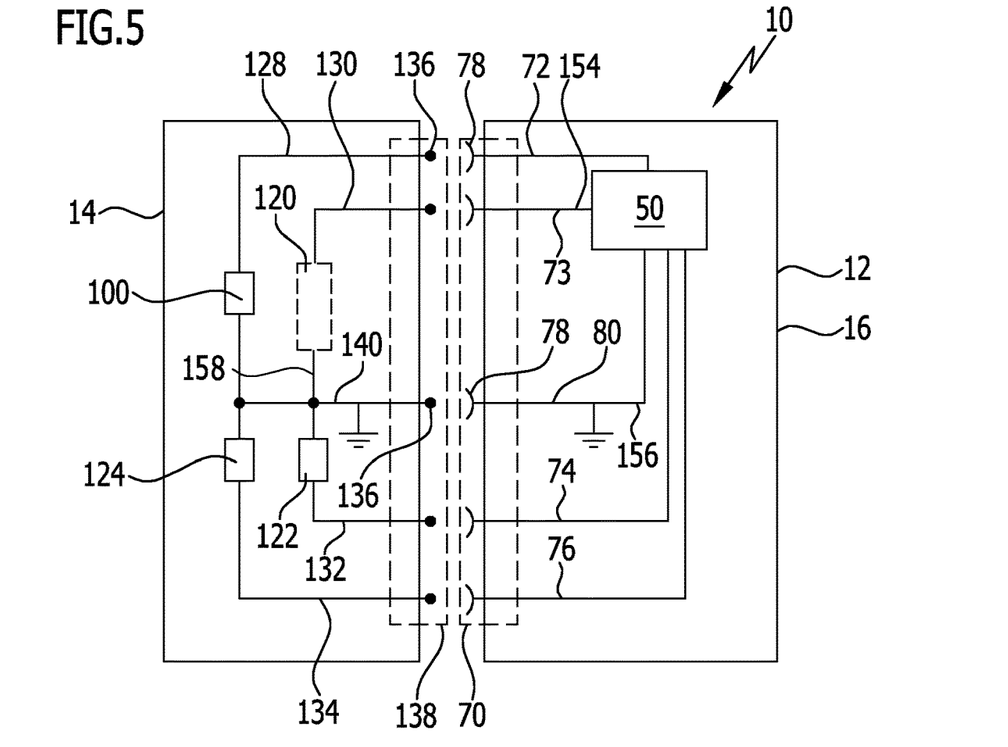
FIG. 5 shows schematically mutually coupled connection elements of the floor treatment apparatus and the docking station, in a block diagram.

Moreover, the apparatus 16 has a plurality of control lines, which are illustrated in FIG. 2 as common control lines and are designated by the reference numeral 68. The control lines 68 are connected to the control device 50. At an end, the control lines 68 have a control line connection element 70 in which electrical contact elements 78 of all the control lines 68 are received. The control line connection element 70 is arranged on the front side 38. FIG. 5 shows the control lines 72, 73, 74 and 76 of the apparatus 16, which in the illustration of FIG. 2 are illustrated jointly by the control line 68. Respective electrical contact elements 78 are likewise illustrated in FIG. 5.

For the sake of clarity, FIG. 2 also dispenses with the illustration of a common return line 80 of the apparatus 16, which is coupled to the control device 50. A different electrical potential can be applied across the control lines 68—with reference to the example in FIG. 5 the control lines 72, 73, 74 and 76—from that across the return line 80. A contact element 78 at the end of the return line 80 is likewise received in the control line connection element 70. The return line 80 may in particular be at earth potential.

FIG. 2 also shows the energy supply line 64 as unipolar, as are signal lines of the level sensors 52 and control lines for the valves 46, 48 and a line for controlling the suction unit 30. It will be appreciated that it will be clear to those skilled in the art that these lines may be multi-polar. In particular, a return line (not shown in the drawing) is provided for the energy supply line 64.

Figure 3:
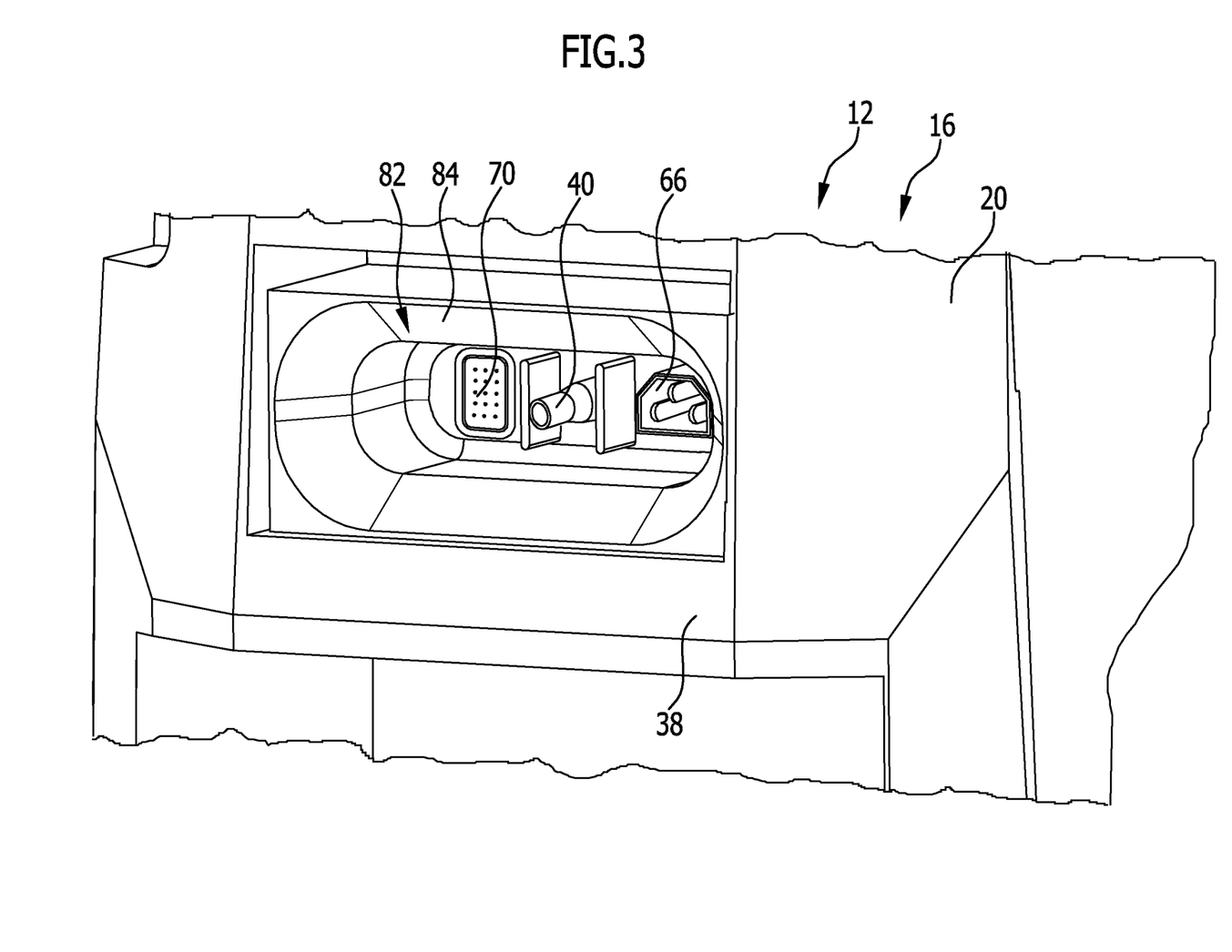
FIG. 3 shows a simplified perspective illustration of part of a front side of the floor treatment apparatus from FIG. 1, wherein a connection unit having a plurality of connection elements of the floor treatment apparatus is illustrated.

On the front side 38, the apparatus 16 comprises a connection unit 82. The connection unit 82 has a housing 84 in which the connection element 40 of the liquid conduit 36, the energy supply connection element 66 of the energy supply line 64 and the control line connection element 70 of the control lines 68 and the return line 80 are received. The connection element 40 is positioned between the energy supply connection element 66 and the control line connection element 70 (these being in the form of sockets in the present case) such that these last are at a spacing from one another. This serves to enhance the operational safety and electromagnetic compatibility of the floor treatment system 10.

The apparatus 16 may be a self-propelling and self-steering floor cleaning apparatus (a floor cleaning robot) by which the floor surface 18 may be cleaned autonomously. The control device 50 can control the movements of the apparatus 16, its cleaning units and the suction unit 30.

As an alternative or in addition, it may be provided for the apparatus 16 to be guided manually, and to be guided over the floor surface 18 by an operator. A drive for the travelling gear 34 may be provided. The operator may operate the apparatus 16 by way of a handle 86, which is illustrated schematically in FIG. 1 and comprises in particular a gripping device.

The docking station 14 comprises a housing 88 that has a supply conduit 90. The supply conduit 90 is a liquid conduit that is connectable by way of a connection element 92 to a liquid supply network. At the other end, the supply conduit 90 comprises a connection element 94 for connecting to the connection element 40. A valve 98 is connected into the supply conduit 90 and is coupled to an actuator of the docking station 14, namely a valve actuator 100.

Further provided in the housing 88 is a collection container 102 for dirty liquid into which there opens a supply conduit 104 of the docking station 14. A connection element 106 can be coupled to the connection element 58.

On the output side of the collection container 102 there is connected a drainage conduit 108 for dirty liquid. A pumping unit 110 of the docking station 14 is connected into the drainage conduit 108. When the pumping unit 110 is activated, dirty liquid can be pumped out of the collection container 102 and supplied to a liquid drainage network by way of a connection element 112.

The docking station 14 comprises an energy supply line 114 that is connectable to a power supply network. At the end of the energy supply line 114, an energy supply connection element 116 for coupling to the energy supply connection element 66 is provided. An energy supply line 118 to which the pumping unit 110 is connected branches off from the energy supply line 114.

The docking station 14 comprises further actuators, namely an electrical switch actuator 120 for selectively activating or deactivating the energy supply line 114. Moreover, an electrical switch actuator 122 is provided for selectively activating or deactivating the energy supply line 118. The switch actuators 120, 122 take the form of relays.

Moreover, the docking station 14 comprises a further actuator, in the present case taking the form of a valve actuator 124. The valve actuator 124 operates the valve 56 for selectively opening or blocking the outlet conduit 54. The valve actuator 124 may for example be a drive actuator for a valve 56 taking the form of a hose clamp in order selectively to clamp off or open a hose-like outlet conduit 54.

Like the apparatus 16, the docking station 14 comprises a plurality of control lines. The control lines are provided for actuating or controlling the actuators 100, 120, 122 and 124 and, for the sake of clarity, are symbolized in certain portions in FIG. 2 by a common control line 126. As is likewise clear from FIG. 2 and FIG. 5, the control lines 126 comprise a control line 128 that is connected to the valve actuator 100 and associated with the control line 72. Further, a control line 130 is provided that is connected to the switch actuator 120 and associated with the control line 73. Moreover, the control lines 126 comprise a control line 132 that is connected to the switch actuator 122 and associated with the control line 74. Further, the control lines 126 comprise a control line 134 that is connected to the valve actuator 124 and associated with the control line 76.

Contact elements 136 on the ends of the control lines 126 are received in a common control line connection element 138 for coupling to the control line connection element 70.

Accordingly, like the apparatus 16, the docking station 14 comprises a return line 140 associated with the control lines 126. A common return line 140 is provided, and a different electrical potential from that across the return line 140 is applicable across the control lines 126. For example, the return line is at earth potential. A contact element 136 of the return line 140 is also received in the control line connection element 138.

A level sensor 142 is provided, and by way of this the level of liquid in the collection container 102 is determinable. The level sensor 142 is connected to the control line connection element 138 by way of a signal line 144. A corresponding signal line (not shown in the drawing) is provided in the apparatus 16 and connected to the control line connection element 70 in order to provide a level signal of the level sensor 142 to the control device 50.

Like the energy supply line 64, the energy supply lines 114, 118 can comprise return lines (not illustrated in the drawing). The same applies to the signal line 144, whereof the return line may also be formed by the return line 140.

Figure 4:
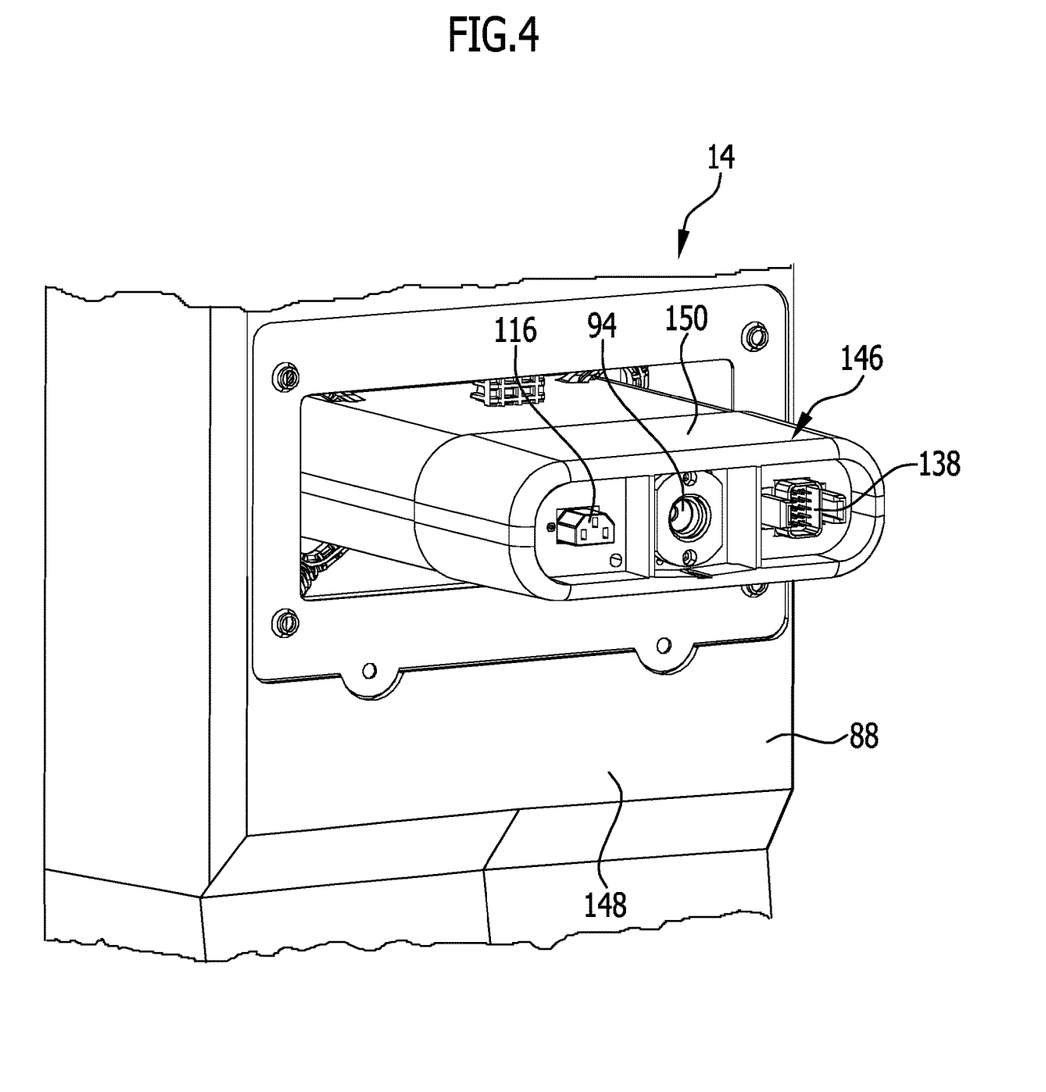
FIG. 4 shows a simplified perspective illustration of part of the docking station from FIG. 1, wherein a connection unit having a plurality of connection elements of the docking station is illustrated.

The docking station 14 comprises a connection unit 146 that is arranged on an end face 148 of the docking station 14 facing the apparatus 16. The connection unit 146 has a housing 150 that is preferably held on the docking station 14 such that its position is variable in order to facilitate docking of the apparatus 16.

The housing 150 receives the connection element 94, which in the present case takes the form of a socket. The energy supply connection element 116 and the control line connection element 138 are arranged on mutually remote sides of the connection element 94, which is positioned between them.

The energy supply lines 64, 114 and 118 and the energy supply connection elements 66, 116 are designed for a mains voltage supply, for example approximately 230 V or approximately 120 V. In contrast, the control lines 68 and 126 and the control line connection elements 70, 138 are designed for a low voltage, for example approximately 24 V or approximately 12 V.

The apparatus 16 can be moved into a docked position on the docking station 14 for filling up or recharging a consumable component, or draining off dirty liquid. This may be performed automatically, controlled by the control device 50, or guided manually by an operator. A trigger for moving into the docked position may be for example a signal from one of the level sensors 52, resulting from an empty reservoir 32 or a full dirty liquid container 34, and/or a signal from the energy supply device 60 if the charge condition thereof falls below a threshold value.

For adopting the docked position, the apparatus 16 moves up to the docking station 14 such that the connection units 82, 146 are joined to and in particular inserted into one another. Here, the connection elements 40 and 94 may be coupled to one another in fluidic connection, and the energy supply connection elements 66 and 116 and the control line connection elements 70 and 138 may be electrically coupled to one another in contact-based manner. The liquid conduit 36 is connected to the supply conduit 90. The energy supply line 64 is connected to the energy supply line 114. The control lines 68 are connected to the control lines 126, and the return line 80 to the return line 140. Moreover, the connection elements 58 and 106 may be coupled for forming a fluidic connection between the outlet conduit 54 and the supply conduit 104.

Accordingly, in the docked position the control lines 72 and 128, 73 and 130, 74 and 132 and 76 and 134 are electrically connected to one another by way of the respective contact elements 78 and 136. This makes it possible, as explained below, to actuate or control the actuators 100, 120, 122 and 124 from the control device 50 by way of a respective control circuit. Here, the control device 50 of the apparatus 16 can be used. For reducing the complexity of the floor treatment system 10, it is not necessary for the docking station 14 to comprise a separate control device. The electrical energy can be provided by the energy supply device 60.

For enhancing the operational safety of the floor treatment system 10, it further has a detection device 152 in order to determine when the apparatus 16 adopts the docked position on the docking station 14. The detection device 152 comprises the control device 50 and detection lines 154, 156 in the apparatus 16 that are coupled to the control device 50. In the present case, the detection lines 154, 156 are formed for example by the control line 73 and the return line 80.

On the station side, the detection device 152 comprises a contact bridge 158. The detection device 152 is in a form such that, for determining whether the apparatus 16 is in the docked position 14, it is determinable whether the apparatus 16 and the docking station 14 are in electrically conductive contact. For this purpose, the control device 50 can determine whether the detection lines 154, 156 are electrically conductively connected to one another on the station side by way of the contact bridge 158 and a detection circuit is closed.

In the apparatus 16, the contact bridge 158 is formed by the control line 130, the return line 140 and the switch actuator 120 connected between them. Accordingly, the switch actuator 120 is connected to the contact bridge 158.

The fact that the docked position has been adopted can be determined by the control device 50 in that the electrically conductive connection of the detection lines 154, 156 by way of the contact bridge 158 is checked. If this is determined positively, the control device 50 works on the assumption that the apparatus 16 is correctly docked to the docking station 14.

Checking the electrically conductive connection by way of the contact bridge 158 further provides the possibility of checking the functionality of the switch actuator 120. In the present case, for example, the flow of current through a control or excitation coil of the switch actuator 120 is checked.

Furthermore, it may in particular be possible for an electrical connection through at least one further actuator to be checked, for verifying the adoption of the docked position and/or checking the functionality of the corresponding actuator. For example, as a supplementary measure the switch actuator 122 is checked for the passage of current, wherein the control line 74 and the return line 80 act as detection lines and the control line 132 and the return line 140, with the switch actuator 122 connected therein, form a contact bridge.

In FIG. 5, the switch actuator 120 is illustrated in dashed lines. This is intended to symbolize the fact that the contact bridge 158 may also comprise a short-circuited connection between the contact element 136 of the return line 140 and a further contact element 136. A short-circuited connection of this kind may be located within the control line connection element 138.

The operational safety of the floor treatment system 10 is enhanced in that the actuators 100, 120, 122 and 124 are only actuated or controlled by the control device 50 once the adoption of the docked position has been positively determined.

In particular, the energy supply line 114 is initially interrupted on docking. As a result, the electrical contact elements of the energy supply connection element 116 are de-energized. The control device 50 can actuate the switch actuator 120, for charging the at least one battery 62 (where necessary), by way of the control lines 73, 130. The relay activates the energy supply line 114, with the result that electrical energy is applied to the control device 50 by way of the energy supply line 114 and the energy supply line 64. The battery 62 can be charged using an on-board charger of the control device 50.

The control device 50 can actuate the switch actuator 120 before the apparatus 16 is undocked in order to deactivate the energy supply line 114. As a result, contact elements of the connection element 116 are de-energized, and any discharge when the apparatus 16 is undocked can be avoided.

The other actuators may also be actuated in the docked position of the apparatus 16.

For example, the control device 50 controls the valve actuator 100 for opening the supply conduit 90. The reservoir 32 can be filled with cleaning liquid by way of the fluid connection with the liquid conduit 36. The dirty liquid container 34 can be rinsed for cleaning. The valves 46, 48 can be controlled in a suitable manner by the control device 50. By further controlling the valve actuator 100 by way of the control device 50, the supply conduit 90 can be blocked.

The control device 50 can further control the valve actuator 124 in order to unblock the outlet conduit 54 by way of the valve 56. Dirty liquid can be drained out of the dirty liquid container 34 and into the collection container 102. It is also possible to drain off rinsing liquid from rinsing the dirty liquid container 34. Controlling the valve actuator 124 again allows the control device 50 to block the outlet conduit 54 by way of the valve 56.

Further, the control device 50 can actuate the switch actuator 122 for connecting the energy supply line 118. Electrical energy is applied to the pumping unit 110, which can pump dirty liquid out of the collection container 102 and supply it to the liquid drainage network. Controlling the switch actuator 122 again allows the energy supply line 118 to be deactivated and the pumping unit 110 switched off.

It will be appreciated that activation of the pumping unit 110 and switching the valves 98, 46 and 48 may be performed in particular by a signal from the respective level sensor 142 or 52.

As mentioned, the floor treatment system 10 is of low complexity, in particular on the docking station 14 side. By dispensing with a control device in the docking station 14, there is in particular no need to transmit signals between the apparatus 16 and the docking station 14 for triggering a charging procedure, a filling procedure, a rinsing procedure or an emptying procedure. This makes the floor treatment system 10 considerably less susceptible to faults than conventional systems. The actuators 100, 120, 122 and 124 may be actuated in a manner free of signal transmission, for example solely by the application of a potential difference across the control lines 68, 126 in relation to the return lines 80, 140.

Figure 6:
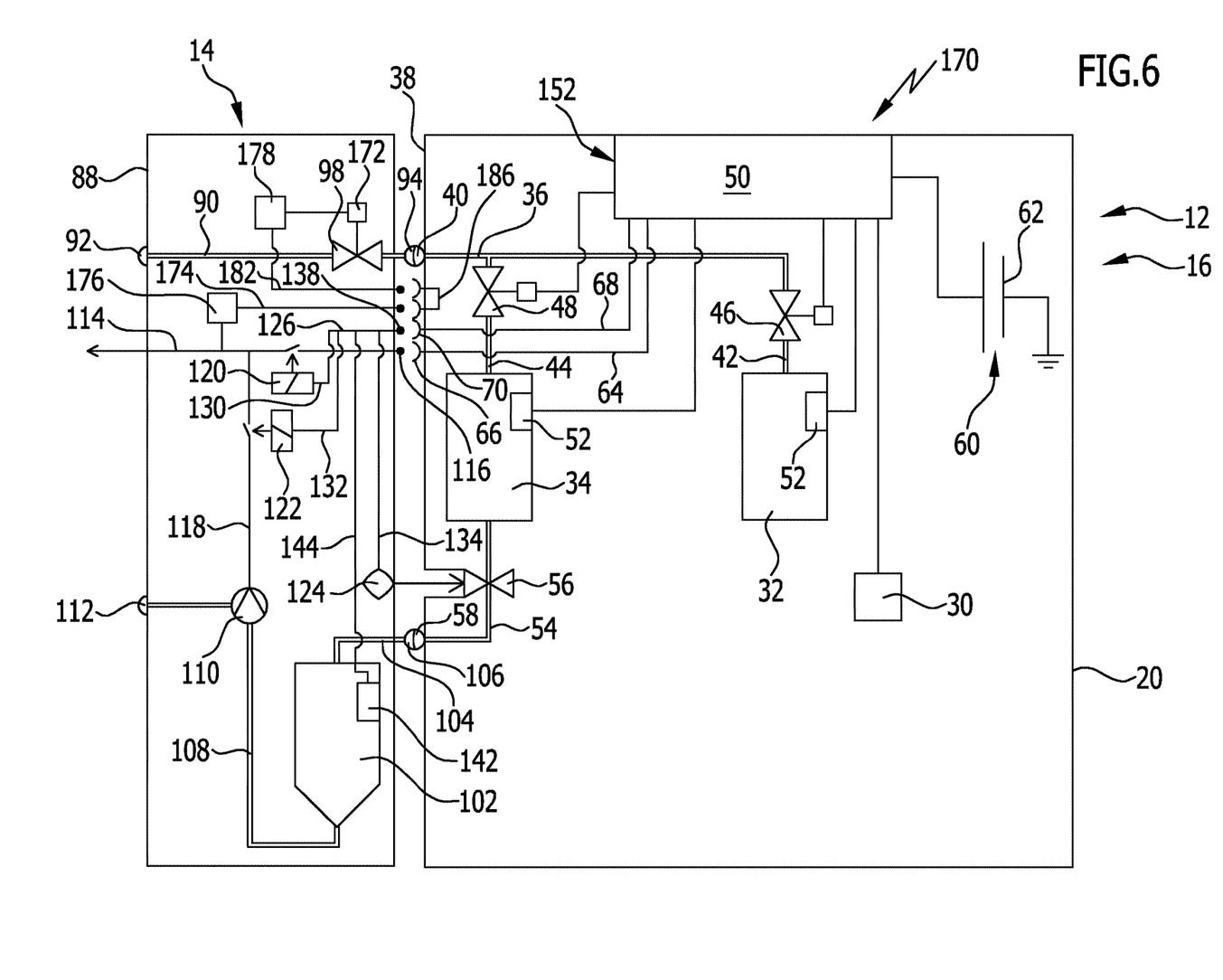
FIG. 6 shows a further preferred embodiment of a floor treatment system in accordance with the invention, in a manner corresponding to FIG. 2.
Figure 8:
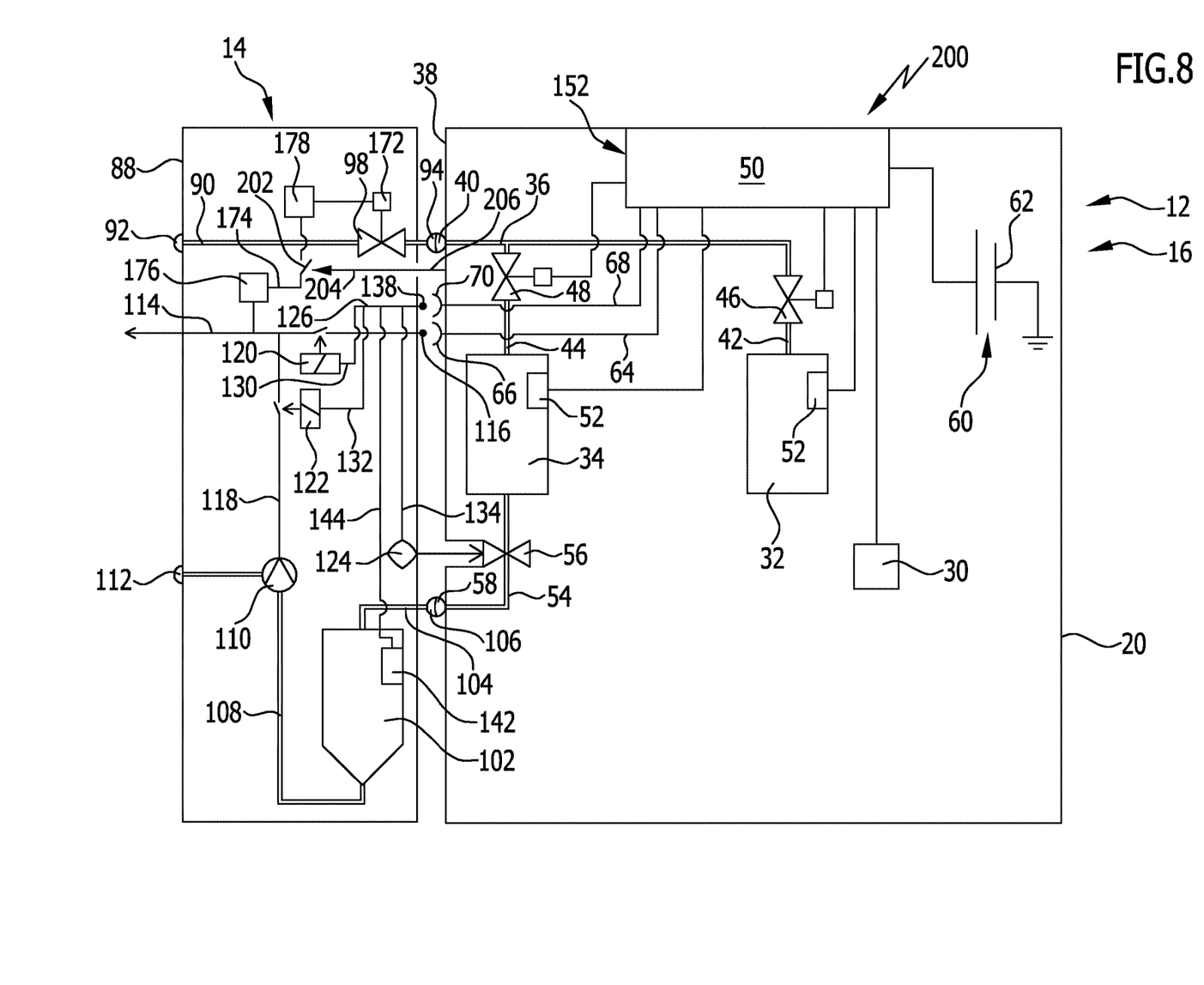
FIG. 8 shows a third preferred embodiment of a floor treatment system in accordance with the invention, in a manner corresponding to FIG. 2.

Further preferred embodiments of the floor treatment system in accordance with the invention, which are illustrated in FIGS. 6 and 8 in a manner corresponding to FIG. 2, are set out below. The floor treatment system in accordance with FIG. 6 bears reference numeral 170 and the floor treatment system in accordance with FIG. 8 bears reference numeral 200.

For like or equivalent features and components in the floor treatment systems 10, 170 and 200, identical reference numerals are used. The advantages that are achievable with the floor treatment system 10 can likewise be achieved with the floor treatment systems 170 and 200. To avoid repetition, the reader may refer to the statements above, and only the essential differences are discussed below.

In particular, in the floor treatment systems 170 and 200 the valve actuator 100 for the valve 98 is dispensed with. Instead, a valve actuation element 172 is coupled to the valve 98. The valve actuation element 172 is connected to an energy supply line 174. A voltage converter 176 is connected into the energy supply line 174. The energy supply line 174 branches off from the energy supply line 114, and as a result of the voltage converter 176 the mains voltage of the energy supply line 114 is reduced to a low voltage of for example approximately 24 V or 12 V. Further, a timing member 178 is connected into the energy supply line 174.

Figure 7:
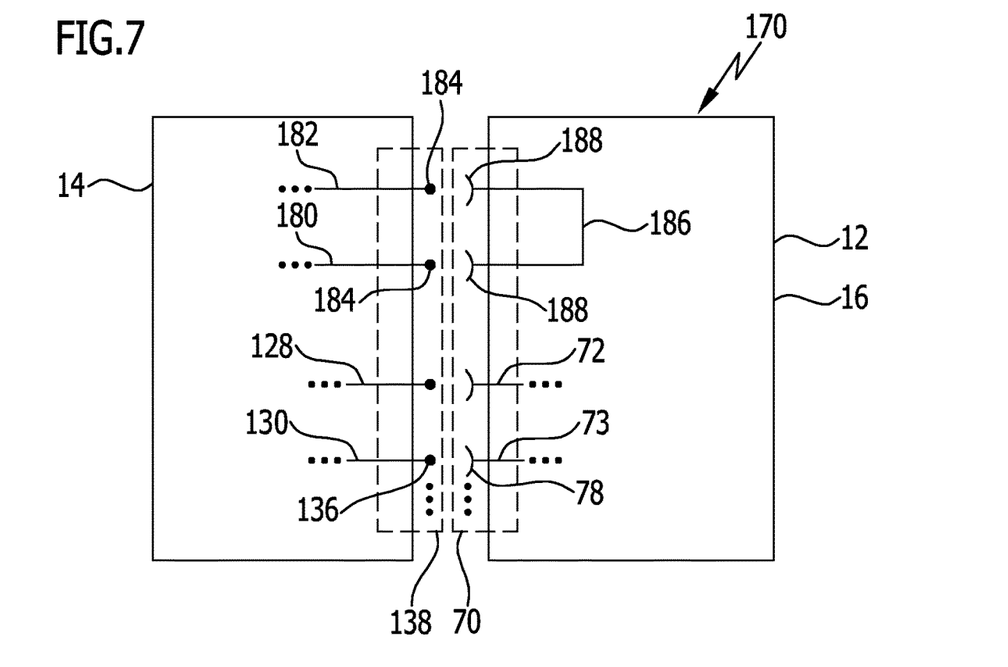
FIG. 7 shows schematically mutually coupled connection elements of the floor treatment apparatus and the docking station.

In the case of the floor treatment system 170, the energy supply line 174 comprises two line portions 180, 182 in the docking station 14, having contact elements 184 which are preferably received in the control line connection element 138. The apparatus 16 has a contact bridge 186 that is associated with the line portions 180, 182 and is preferably received in the control line connection element 70. Its contact elements 188 can be electrically coupled to the contact elements 184 when the apparatus 16 is docked, with the result that electrical energy can be supplied to the valve actuation element 172 through the line portions 180, 182 and the contact bridge 186. FIG. 7 shows this schematically, with the control lines 72, 73, 128 and 130 also being shown in addition and by way of example. Here too, any respective return line (not illustrated in the drawing) may be present.

When the apparatus 16 is docked, the supply conduit 90 is opened by way of the valve 98. It is possible to set the delay at which this is performed, in the timing member 178. This makes it possible to ensure that the connection elements 40, 94 have first formed a fluid-tight connection between the liquid conduit 36 and the supply conduit 90, and an escape of liquid between the connection elements 40, 94 can be prevented.

Once the reservoir 32 and/or the dirty liquid container 34 have been filled, the apparatus 16 can be undocked. An escape of liquid may be prevented for example by automatically closing valves arranged on the connection elements 40, 94. Moreover, automatically closing valves of this kind may also be provided in the floor treatment system 10 and on the connection elements 58, 106.

In the floor treatment system 200, instead of the line portions 180, 182 and the contact bridge 186, there is provided an electrical switching element 202 that is connected into the energy supply line 174. The apparatus 16 has a contact element 204 that takes the form for example of a slide 206 and is arranged on the front side 38.

When the apparatus 16 is docked, the slide 206 can make mechanical contact with the switching element 202 in order to activate an electrical connection in the energy supply line 174 to the valve actuation element 172. When the apparatus 16 is undocked, the contact between the slide 206 and the switching element 202 is broken, and the supply of energy is deactivated.

The floor treatment systems 170 and 200 have the particular advantage that their docking station 14 can be used with conventional floor treatment and in particular floor cleaning apparatuses that have no control device 50 (not shown in the drawing), or that are not intended for controlling the actuators of the docking station 14. These include for example manually guided apparatus in which it is nonetheless desirable to fill a reservoir 32 or to rinse a dirty liquid container 34. This is then likewise possible with the docking station 14 of the floor treatment systems 170 and 200, because actuation of the valve 98 is possible purely because the apparatus 16 is in the docked position.

REFERENCE NUMERALS

- 10 Floor treatment system
- 12 Floor treatment apparatus
- 14 Docking station
- 16 Floor cleaning apparatus (apparatus)
- 18 Floor surface
- 20 Housing
- 22 Travelling gear
- 24 Cleaning unit
- 26 Dirt receiving device
- 28 Suction bar
- 30 Suction unit
- 32 Reservoir
- 34 Dirty liquid container
- 36 Liquid conduit
- 38 Front side
- 40 Connection element
- 42 First conduit portion
- 44 Second conduit portion
- 46 Valve
- 48 Valve
- 50 Control device
- 52 Level sensor
- 54 Outlet conduit
- 56 Valve
- 58 Connection element
- 60 Energy storage device
- 62 Battery
- 64 Energy supply line
- 66 Energy supply connection element
- 68 Control lines
- 70 Control line connection element
- 72 Control line
- 73 Control line
- 74 Control line
- 76 Control line
- 78 Contact element
- 80 Return line
- 82 Connection unit
- 84 Housing
- 86 Handle
- 88 Housing
- 90 Supply conduit
- 92 Connection element
- 94 Connection element
- 98 Valve
- 100 Valve actuator
- 102 Collection container
- 104 Supply conduit
- 106 Connection element
- 108 Drainage conduit
- 110 Pumping unit
- 112 Connection element
- 114 Energy supply line
- 116 Energy supply connection element
- 118 Energy supply line
- 120 Switch actuator
- 122 Switch actuator
- 124 Valve actuator
- 126 Control lines
- 128 Control line
- 130 Control line
- 132 Control line
- 134 Control line
- 136 Contact element
- 138 Control line connection element
- 140 Return line
- 142 Level sensor
- 144 Signal line
- 146 Connection unit
- 148 End face
- 150 Housing
- 152 Detection device
- 154 Detection line
- 156 Detection line
- 158 Contact bridge
- 170 Floor treatment system
- 172 Valve actuation element
- 174 Energy supply line
- 176 Voltage converter
- 178 Timing member
- 180 Line portion
- 182 Line portion
- 184 Contact element
- 186 Contact bridge
- 188 Contact element
- 200 Floor treatment system
- 202 Switching element
- 204 Contact element
- 206 Slide

What is claimed is:

1. A floor treatment system, comprising a mobile floor treatment apparatus and a docking station therefor, wherein the floor treatment apparatus comprises a control device, at least one control line coupled thereto, and an electrical energy storage device for supplying energy to the floor treatment apparatus, and the docking station comprises at least one actuator and at least one control line coupled thereto, wherein, when the floor treatment apparatus is in a docked position on the docking station, the control lines are coupled to one another in contact-based manner by way of control line connection elements, wherein the floor treatment system comprises a detection device for determining whether the floor treatment apparatus is in the docked position, and wherein, if this is determined positively, at least one actuator of the control device is actuatable or controllable by way of the control lines.

2. A floor treatment system in accordance with claim 1, wherein the energy storage device comprises at least one rechargeable battery.

3. A floor treatment system in accordance with claim 2, wherein the floor treatment apparatus comprises an energy supply line and the docking station comprises an energy supply line, wherein, when the floor treatment apparatus is in the docked position, the energy supply lines are coupled to one another in contact-based manner by way of energy supply connection elements, and wherein at least one actuator of the docking station comprises or forms an electrical switch actuator by which the energy supply line of the docking station is activatable by the control device in order to apply electrical energy to the at least one battery for charging.

4. A floor treatment system in accordance with claim 3, wherein the energy supply connection elements are formed separately from the control line connection elements.

5. A floor treatment system in accordance with claim 4, wherein the energy supply connection elements and the control line connection elements are spatially separated, and are arranged spaced from one another on the floor treatment apparatus and the docking station.

6. A floor treatment system in accordance with claim 4, wherein at least one of the floor treatment apparatus and the docking station comprise a connection unit that receives a respective energy supply connection element and a respective control line connection element.

7. A floor treatment system in accordance with claim 3, wherein the switch actuator is controllable by the control device for deactivating the energy supply line of the docking station.

8. A floor treatment system in accordance with claim 3, wherein the energy supply lines and the energy supply connection elements are designed for a mains voltage supply of approximately 230 V or approximately 120 V.

9. A floor treatment system in accordance with claim 1, wherein the control lines and the control line connection elements are designed for a low voltage of approximately 24 V or approximately 12 V.

10. A floor treatment system in accordance with claim 1, wherein the docking station comprises a plurality of actuators, and wherein the floor treatment apparatus and the docking station each have a plurality of control lines, wherein a respective actuator is controllable by way of a control line of the floor treatment apparatus and a control line of the docking station, and wherein a respective common control line connection element is provided on the floor treatment apparatus and the docking station for the respective control lines.

11. A floor treatment system in accordance with claim 1, wherein the floor treatment apparatus comprises a return line that is coupled to the control device, and wherein the docking station comprises at least one return line, and between this and the at least one control line of the docking station there is connected the at least one actuator, wherein, when the floor treatment apparatus is in the docked position, the return lines are coupled to one another by way of connection elements, and a control circuit is formed by way of the control lines and the return lines.

12. A floor treatment system in accordance with claim 10, wherein the return lines of the floor treatment apparatus and the docking station are coupled to one another by way of the respective control line connection element of the floor treatment apparatus and the docking station.

13. A floor treatment system in accordance with claim 11, wherein the floor treatment apparatus and the docking station each comprise a common return line, wherein the return line of the floor treatment apparatus is coupled to the control device, a respective actuator of the docking station being connected between the return line of the docking station and the respective control line thereof.

14. A floor treatment system in accordance with claim 1, wherein the at least one actuator is actuatable or controllable by at least one of the provision of an electrical potential difference and the transmission of a control signal.

15. A floor treatment system in accordance with claim 1, wherein, for determining whether the floor treatment apparatus is in the docked position, the detection device is configured to determine whether the floor treatment apparatus and the docking station are in electrically conductive contact.

16. A floor treatment system in accordance with claim 1, wherein the detection device comprises the control device and detection lines in the floor treatment apparatus coupled thereto, which are electrically conductively connected to one another in the docked position of the floor treatment apparatus by way of a contact bridge at the docking station.

17. A floor treatment system in accordance with claim 16, wherein the detection lines are coupled to one another with the contact bridge by way of the control line connection elements of the floor treatment apparatus and the docking station.

18. A floor treatment system in accordance with claim 16, wherein at least one actuator of the docking station is connected into the contact bridge.

19. A floor treatment system in accordance with claim 1, wherein the detection device comprises the control device by which an electrically conductive connection through a respective control line of the floor treatment apparatus and of the docking station, at least one actuator and a respective return line of the floor treatment apparatus and of the docking station is detectable, wherein these return lines are coupled to one another in the docked position.

20. A floor treatment system in accordance with claim 19, wherein by means of the control device electrically conductive connections via respective control lines of the floor treatment apparatus and the docking station through two or more actuators are detectable.

21. A floor treatment system in accordance with claim 1, wherein the at least one actuator comprises or forms an electrical switch actuator for selectively activating or deactivating an energy supply line of the docking station.

22. A floor treatment system in accordance with claim 21, wherein the docking station comprises a pumping unit that is configured to be acted upon by the energy supply line and by way of which liquid is conveyable in a fluid conduit of the docking station.

23. A floor treatment system in accordance with claim 1, wherein the docking station comprises a supply conduit through which a liquid is suppliable to the floor treatment apparatus and into which there is connected a valve.

24. A floor treatment system in accordance with claim 23, wherein, when the floor treatment apparatus is in the docked position, the supply conduit is in fluidic connection with a liquid conduit of the floor treatment apparatus by way of respective connection elements.

25. A floor treatment system in accordance with claim 23, wherein the at least one actuator comprises or forms a valve actuator by way of which the valve for selectively unblocking or blocking the supply conduit is actuatable.

26. A floor treatment system in accordance with claim 23, wherein a valve actuation element, to which electrical energy is applicable by an energy supply line of the floor treatment system, is coupled to the valve.

27. A floor treatment system in accordance with claim 26, wherein the floor treatment apparatus has a contact element that, in the docked position, makes mechanical contact with, and actuates, an electrical switching element that is connected into the energy supply line, as a result of which electrical energy is applied to the valve actuation element by way of the energy supply line.

28. A floor treatment system in accordance with claim 26, wherein the energy supply line comprises a first line portion and a second line portion in the docking station which, when the floor treatment apparatus is in the docked position, are electrically conductively connected to one another by way of a contact bridge on the floor treatment apparatus.

29. A floor treatment system in accordance with claim 28, wherein the line portions are coupled to one another by way of the control line connection elements of the docking station and the floor treatment apparatus with the contact bridge.

30. A floor treatment system in accordance with claim 26, wherein a voltage converter is connected into the energy supply line for converting a mains voltage from a power supply network on the input side into a low voltage applied across the valve actuation element.

31. A floor treatment system in accordance with claim 26, wherein there is connected into the energy supply line a timing member by way of which electrical energy is applied to the valve actuation element with a delay after actuation of the switching element or after a conductive connection is made between the line portions by way of the contact bridge.

32. A floor treatment system in accordance with claim 26, wherein the floor treatment apparatus has a liquid container and an outlet conduit that is connected thereto and into which a valve is connected, and wherein at least one actuator comprises or forms an electrical valve actuator or drive actuator for the valve, by way of which the valve is actuatable for selectively unblocking or blocking the outlet conduit.

33. A floor treatment system in accordance with claim 1, wherein at least one actuator is controllable by the control device in dependence on at least one input signal supplied to the control device.

34. A floor treatment system in accordance with claim 33, wherein the at least one input signal is or comprises at least one of the following:
- a level signal of a level sensor that is associated with a liquid container of the floor treatment apparatus or the docking station, wherein the at least one actuator comprises or forms a valve actuator for selectively unblocking or blocking a fluid conduit of the docking station or of the floor treatment apparatus;
- a charge condition signal of a rechargeable battery of the floor treatment apparatus, wherein the at least one actuator comprises or forms an electrical switch actuator for selectively activating or deactivating an energy supply line of the docking station.

35. A floor treatment system in accordance with claim 1, wherein the floor treatment apparatus is self-propelling and self-steering.

36. A floor treatment system in accordance with claim 1, wherein the floor treatment apparatus is guided manually.

37. A floor treatment system in accordance with claim 1, wherein the floor treatment apparatus is a floor cleaning apparatus and has at least one cleaning unit for cleaning a floor surface.

38. A method for operating a floor treatment system that comprises a mobile floor treatment apparatus and a docking station therefor, in which, when the floor treatment apparatus is in a docked position, connection elements of the floor treatment apparatus and the docking station are coupled to one another in contact-based manner, and an electrical connection is formed between a control device of the floor treatment apparatus and at least one actuator arranged in the docking station by way of respective control lines of the floor treatment apparatus and the docking station, the method comprising determining if the floor treatment apparatus is in the docked position, and, if this is determined positively, controlling or actuating the at least one actuator by the control device by way of the control lines.

39. A floor treatment system, comprising a mobile floor treatment apparatus and a docking station therefor, wherein the floor treatment apparatus comprises a control device, at least one control line coupled thereto, and an electrical energy storage device for supplying energy to the floor treatment apparatus, and the docking station comprises at least one actuator and at least one control line coupled thereto, wherein, when the floor treatment apparatus is in a docked position on the docking station, the control lines are coupled to one another in contact-based manner by way of control line connection elements, wherein the floor treatment system comprises a detection device for determining whether the floor treatment apparatus is in the docked position, and wherein, if this is determined positively, at least one actuator of the control device is actuatable or controllable by way of the control lines; and wherein the docking station comprises a supply conduit through which a liquid is suppliable to the floor treatment apparatus and into which there is connected a valve.

* * * * *

UNITED STATES PATENT AND TRADEMARK OFFICE
CERTIFICATE OF CORRECTION

PATENT NO. : 11,272,821 B2
APPLICATION NO. : 16/178933
DATED : March 15, 2022
INVENTOR(S) : Christian Wurm et al.

It is certified that error appears in the above-identified patent and that said Letters Patent is hereby corrected as shown below:

On the Title Page

Applicant should read as "ALFRED KÄRCHER SE & CO. KG"

Signed and Sealed this
Fourteenth Day of February, 2023

Katherine Kelly Vidal
*Director of the United States Patent and Trademark Office*